(12) United States Patent
Jung et al.

(10) Patent No.: US 10,003,207 B2
(45) Date of Patent: Jun. 19, 2018

(54) METHOD AND APPARATUS FOR BATTERY CHARGING

(71) Applicant: Samsung Electronics Co., Ltd., Gyeonggi-do (KR)

(72) Inventors: Kuchul Jung, Seoul (KR); Sunggeun Yoon, Gyeonggi-do (KR); Kisun Lee, Gyeonggi-do (KR); Jungmin Lee, Gyeonggi-do (KR); Seyoung Jang, Gyeonggi-do (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 28 days.

(21) Appl. No.: 14/842,048

(22) Filed: Sep. 1, 2015

(65) Prior Publication Data

US 2016/0064958 A1    Mar. 3, 2016

(30) Foreign Application Priority Data

Sep. 2, 2014  (KR) .................. 10-2014-0116465

(51) Int. Cl.
*H02J 7/00* (2006.01)
(52) U.S. Cl.
CPC .......... *H02J 7/0068* (2013.01); *H02J 7/0031* (2013.01); *H02J 7/0091* (2013.01)
(58) Field of Classification Search
USPC ....................................................... 320/107
See application file for complete search history.

(56) References Cited

U.S. PATENT DOCUMENTS

| 8,717,186 | B2 | 5/2014 | Zhou | |
| 2008/0074084 | A1* | 3/2008 | Lee | H02J 7/0031 320/150 |
| 2009/0289603 | A1* | 11/2009 | Mahowald | H02J 7/0057 320/151 |
| 2010/0085018 | A1* | 4/2010 | Cruise | H01M 10/425 320/150 |
| 2010/0327812 | A1* | 12/2010 | Hsieh | H02J 7/0091 320/134 |
| 2013/0099757 | A1* | 4/2013 | Ham | H02J 7/0047 320/150 |
| 2013/0307476 | A1* | 11/2013 | Darragh | B60L 3/00 320/109 |
| 2014/0084873 | A1 | 3/2014 | Sim et al. | |
| 2014/0277791 | A1* | 9/2014 | Lenard | B60K 6/20 700/287 |
| 2015/0060429 | A1* | 3/2015 | Song | H01L 23/345 219/209 |

FOREIGN PATENT DOCUMENTS

| JP | 2010-115047 A | 5/2010 |
| JP | 5303827 B2 | 7/2013 |
| KR | 10-2014-0040027 A | 4/2014 |

* cited by examiner

*Primary Examiner* — Mohammed Alam
(74) *Attorney, Agent, or Firm* — Cha & Reiter, LLC

(57) ABSTRACT

An electronic device comprising: an interface arranged to connect to an external power supply device and supply power to a battery; a sensor unit arranged to measure a temperature of the electronic device; and a power management unit configured to charge the battery based on the temperature.

14 Claims, 10 Drawing Sheets

METHOD AND APPARATUS FOR BATTERY CHARGING

CLAIM OF PRIORITY

This application claims priority from and the benefit under 35 U.S.C. § 119(a) of Korean Patent Application No. 10-2014-0116465, filed on Sep. 2, 2014, which is hereby incorporated by reference for all purposes as if fully set forth herein.

BACKGROUND

1. Field of the Disclosure

The present disclosure relates to electronic devices and more particularly to a method and apparatus for battery charging.

2. Description of the Prior Art

Typically, an electronic apparatus, such as a smartphone, a tablet Personal Computer (PC), a Portable Multimedia Player (PMP), a Personal Digital Assistant (PDA), a laptop PC, a wrist watch, a wearable device such as a Head-Mounted Display (HMD), and the like, recently has not only a telephone call function but also various other functions (e.g., a Social Network Service (SNS), the Internet, multimedia, capturing still/moving images and reproduction of the captured still/moving images, etc.). The more various functions the portable electronic apparatus has, the more current a processor thereof consumes. Accordingly, interest in various high-performance batteries and charging technology has increased.

SUMMARY

According to aspects of the disclosure, an electronic device is provided comprising: an interface arranged to connect to an external power supply device and supply power to a battery; a sensor unit arranged to measure a temperature of the electronic device; and a power management unit configured to charge the battery based on the temperature.

According to aspects of the disclosure, a method for charging an electronic device, comprising: identifying a full charging voltage of a battery; measuring a temperature of the electronic device; and charging the battery based on the temperature.

BRIEF DESCRIPTION OF THE DRAWINGS

The above and other objects, features and advantages of the present disclosure will be more apparent from the following detailed description in conjunction with the accompanying drawings, in which.

DETAILED DESCRIPTION

Hereinafter, the detailed description of various embodiments of the present disclosure will present representative embodiments of the present disclosure for solving the foregoing technical problems. Also, the names of the defined elements may be identically used for convenience of the description of various embodiments of the present disclosure. However, the names used for the convenience of the descriptions do not limit the scope of the present disclosure, and may be applied to a system having a similar technical background through the same or easy modification.

For the same reason, in the accompanying drawings, some components may be exaggerated, omitted, or schematically illustrated, and a size of each component may not precisely reflect the actual size thereof. Accordingly, various embodiments of the present disclosure are not restricted by the relative sizes of or distances between elements illustrated in the accompanying drawings.

Further, singular forms as used in various embodiments of the present disclosure are intended to include plural forms, unless clearly indicated in the context. Further, the term "and" used in the present specification should be understood as including any and all combinations of one or more of the associated listed items.

Also, the term, such as "unit", "module", or the like, means a unit for processing at least a function or an operation, and may be implemented in hardware, software, or a combination hardware and software.

Hereinafter, various embodiments of the present disclosure will be described with reference to the accompanying drawings.

Figure 1:
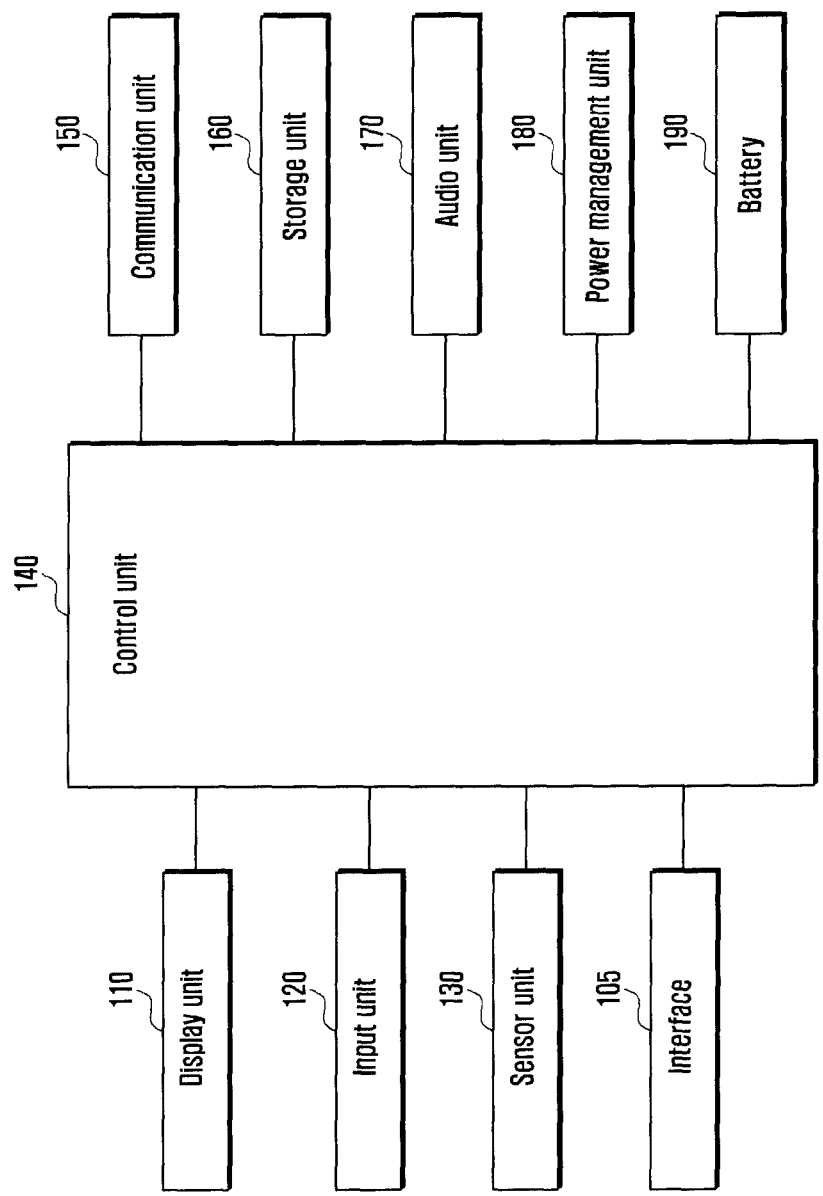
FIG. 1 is a block diagram of an example of an electronic apparatus 100 according to an embodiment of the present disclosure.

FIG. 1 is a block diagram of an example of an electronic apparatus 100 according to an embodiment of the present disclosure.

The electronic apparatus 100 may include an interface 105, a display unit 110, an input unit 120, a sensor unit 130, a control unit 140, a communication unit 150, a storage unit 160, an audio unit 170, a power management unit 180, and a battery 190.

The interface 105 may include, for example, a High-Definition Multimedia Interface (HDMI), a Universal Serial Bus (USB), an optical interface, and/or a D-subminiature (D-sub). The interface 105 may include, for example, a Mobile High-definition Link (MHL) interface, a Secure Digital (SD) card/Multi-Media Card (MMC) interface, and/or an Infrared Data Association (IrDA) standard interface.

A power supply device, for example, a Travel Adapter (TA), a Travel Charger (TC), or an adaptive TA, that converts Alternating Current (AC) power into Direct Current (DC) power, may be connected to the interface 105. An external wired or wireless charger may be connected to the interface 105. The interface 105, according to an embodiment of the present disclosure, may have a separate interface specification distinguished from an interface specification (e.g., a 20-pin interface, a micro USB interface, etc.) of a TC (hereinafter "a wired charger") typically used by a conventional portable terminal. The interface 105 may supply the electronic apparatus 100 with power provided by an external power supply device.

The display unit 110 may display various screens (e.g., a media content reproduction screen, a screen for originating a telephone call, a messenger screen, a game screen, a gallery screen, etc.) according to the operation of the electronic apparatus 100 by a user.

The display unit 110 may display (or output) information processed by the electronic apparatus 100. For example, when the electronic apparatus 100 is in a telephone call mode, the display unit 110 may display a User Interface (UI) or a Graphical UI (GUI) related to a telephone call. Also, when the electronic apparatus 100 is in a video call mode or an image-capturing mode, the display unit 110 may display a captured and/or received image, a UI, or a GUI. According to the rotation direction (or the placement direction) of the electronic apparatus 100, the display unit 110 may support the display of a screen in a landscape mode, that of a screen in a portrait mode, and that of a screen switching depending on switching between the landscape mode and the portrait mode.

The display unit 110 may include at least one of a Liquid Crystal Display (LCD), a Thin Film Transistor-LCD (TFT-LCD), a Light Emitting Diode (LED) display, an Organic LED (OLED) display, an Active Matrix OLED (AMOLED) display, a flexible display, a bended display, and a three-Dimensional (3D) display. Some of the displays may be implemented as transparent displays configured in a transparent type or a light transmission type so that the outside can be seen therethrough.

The input unit 120 may receive an input for operating the electronic apparatus 100 from the user. The input unit 120 may receive a touch input from the user. The input unit 120 may include a touch panel. The touch panel may recognize a touch input in at least one of, for example, a capacitive scheme, a resistive scheme, an infrared scheme, and an acoustic wave scheme. Also, the touch panel may further include a control circuit. A capacitive-type touch panel may detect physical contact or proximity. The touch panel may further include a tactile layer. The touch panel may provide a tactile response to the user. The input unit 120 may provide the control unit 140 with an input signal corresponding to the received touch input.

The input unit 120 may include a (digital) pen sensor, a key, and/or an ultrasonic input device. The (digital) pen sensor may be implemented by using, for example, a method identical or similar to a method for receiving a touch input from the user, or a separate recognition sheet. Examples of the key may include a physical button, an optical key, and a keypad. The ultrasonic input device enables the electronic apparatus 100 to detect a micro sound wave through an input means, that generates an ultrasonic signal, and to identify data corresponding to the detected micro sound wave, and may perform wireless recognition.

According to various embodiments of the present disclosure, the display unit 110 and the input unit 120 may be integrated into one unit. For example, the electronic apparatus 100 may include a touch screen. The touch screen may simultaneously perform an input function and a display function. The touch screen may be formed in a structure where a touch panel and a display panel are laminated. The touch screen may include an input/output means. The touch screen may detect a touch event input (e.g., a touch-based long press input, a touch-based short press input, a single-touch-based input, a multi-touch-based input, a touch-based gesture input (e.g., a drag gesture input, etc.), etc.) of the user which contacts the surface of the touch screen. When the touch screen detects a touch event of the user on the surface thereof, the touch screen may detect coordinates, at which the touch event occurs, and may deliver the detected coordinates to the control unit 140.

The touch screen may be configured to convert, into an electrical input signal, a change in pressure applied to a particular part of the surface thereof, capacitance generated at the particular part of the surface thereof, or the like. Also, the touch screen may be configured to be capable of detecting not only a touched position and a touched area but also a pressure during a touch according to an applied touch scheme. When a touch input is detected by the touch screen, a signal (or signals) corresponding to the touch input may be delivered to a touch controller (not illustrated). The touch controller may process the signal (or signals), and may then deliver data, which corresponds to the processed signal (or signals), to the control unit 140.

The sensor unit 130 may measure a physical quantity or may detect an operation state of the electronic apparatus 100, and may convert the measured physical quantity or the detected operation state into an electrical signal. The sensor unit 130 may include at least one of, for example, a gesture sensor, a gyro sensor, an atmospheric pressure sensor, a magnetic sensor, an acceleration sensor, a grip sensor, a proximity sensor, a color sensor (e.g., a Red-Green-Blue (RGB) sensor), a biometric sensor, a temperature/humidity sensor, an illuminance sensor, and an Ultraviolet (UV) sensor. Additionally or alternatively, the sensor unit 130 may include an E-nose sensor, an electromyography (EMG) sensor, an electroencephalogram (EEG) sensor, an electrocardiogram (ECG) sensor, an Infrared (IR) sensor, an iris sensor, a fingerprint sensor, a geomagnetic sensor, and the like. The sensor unit 130 may further include a control circuit for controlling one or more sensors included therein.

According to various embodiments of the present disclosure, the sensor unit 130 may measure a temperature of a system 101 (i.e., at least one element (e.g., the display unit 110, the input unit 120, the sensor unit 130, the control unit 140, the communication unit 150, the storage unit 160, the battery 190, etc.) of the electronic apparatus 100) by using the temperature sensor. According to an embodiment of the present disclosure, while the battery 190 is charged, the sensor unit 130 may measure a surface temperature of the electronic apparatus 100 and a temperature of an internal element, such as the battery 190, a connector, and the like. The sensor unit 130 may deliver the measured temperature to the control unit 140 or the power management unit 180.

The control unit 140 may include any suitable type of processing circuitry, such as one or more general purpose processors (e.g., ARM-based processors), a Digital Signal Processor (DSP), a Programmable Logic Device (PLD), an Application-Specific Integrated Circuit (ASIC), a Field-Programmable Gate Array (FPGA), etc. The control unit 140 may be implemented by, for example, a System on Chip (SoC). According to an embodiment of the present disclosure, the control unit 140 may further include a Graphical Processing Unit (GPU). According to an embodiment of the present disclosure, the control unit 140 may be an Application Processor (AP) or a Communication Processor (CP). According to an embodiment of the present disclosure, the control unit 140 may receive a command from another element through a bus, may interpret the received command, and may perform an arithmetic operation or data processing according to the interpreted command.

According to an embodiment of the present disclosure, the control unit 140 may control the power management unit 180 or the interface 105, and may control power which is input/output to/from the battery 190 or the electronic apparatus 100.

According to an embodiment of the present disclosure, the control unit 140 may operate in conjunction with the power management unit 180 and may control each function or the system 101 (e.g., at least one of the elements of the electronic apparatus 100) of the electronic apparatus 100. For example, the control unit 140 may activate or deactivate a particular user function, particular hardware, or the particular system 101 of the electronic apparatus 100 at the particular temperature under the determination or control of the power management unit 180. The control unit 140 may turn off power of the electronic apparatus 100 at the particular temperature under the determination or control of the power management unit 180.

The communication unit 150 may support a wireless communication function of the electronic apparatus 100, and may be configured as a mobile communication module when the electronic apparatus 100 supports a mobile communication function. The communication unit 150 may include a Radio Frequency (RF) transmitter for upconverting the frequency of a wireless signal to be transmitted and amplifying the upconverted wireless signal, an RF receiver for low-noise amplifying a received wireless signal and downconverting the frequency of the low-noise amplified wireless signal, and the like. Also, when the electronic apparatus 100 supports a wireless short-range communication function such as Wi-Fi communication, Bluetooth communication, Zigbee communication, Ultra-WideBand (UWB) communication, Near Field Communication (NFC), and the like, the communication unit 150 may include a WiFi communication module, a Bluetooth communication module, a Zigbee communication module, a UWB communication module, an NFC communication module, and the like.

The storage unit 160 may store image data, voice data, data provided by a camera, data for arithmetic processing, an algorithm required for an operation of the electronic apparatus 100, set data, guide information, and the like, and may also temporarily store a processing result and the like.

The storage unit 160 may include a volatile memory and/or a non-volatile memory. Examples of the volatile memory may include a Static Random Access Memory (SRAM), a Dynamic Random Access Memory (DRAM), and the like. Examples of the non-volatile memory may include a Read-Only Memory (ROM), a flash memory, a hard disk, a Secure Digital (SD) memory card, a Multi-Media Card (MMC), network-accessible storage (NAS), cloud storage, and the like.

The storage unit 160 may store commands or data which are received or generated from the control unit 140 or the other elements (e.g., the display unit 110, the input unit 120, the sensor unit 130, the communication unit 150, etc.). The storage unit 160 may include programming modules, such as a kernel, middleware, an Application Programming Interface (API), an application, and the like. Each of the above-described programming modules may be implemented in software, firmware, hardware, or a combination of two or more thereof.

The kernel may control or manage system resources (e.g., the bus, the control unit 140, and the storage unit 160) used to execute operations or functions implemented by the other programming modules (e.g., the middleware, the API, and the application). Also, the kernel may provide an interface capable of accessing the individual elements of the electronic apparatus 100 by using the middleware, the API, or the application and thereby controlling or managing the individual elements thereof.

The middleware may serve as an intermediary that enables the API or the application to communicate with the kernel and to exchange data therewith. Also, in relation to task requests received from the application, the middleware may perform control (e.g., scheduling, or loading balancing) over the task requests by using, for example, a method for assigning a priority, which enables the use of system resources (e.g., the bus, the control unit 140, and the storage unit 160) of the electronic apparatus 100, to at least one of the applications.

The API is an interface through which the application controls a function provided by the kernel or the middleware, and may include, for example, at least one interface or function (e.g., command) for file control, window control, image processing, character control, and/or the like.

The audio unit 170 may bidirectionally convert between a voice and an electrical signal. The audio unit 170 may include at least one of, for example, a speaker, a receiver, an earphone, and a microphone, and may convert voice data which is input or output therethrough.

The power management unit 180 may include any suitable type of circuitry (e.g., processing circuitry, battery charging circuitry, etc.). For example, the power management unit may include one or more of a processor, a Field Programmable Gate Array, an Application Specific Integrated Circuit). Although in this example the power management unit 180 is depicted as being separate from the control unit 140, in some implementations the power management unit 180 may be integrated into the control unit 140.

The power management unit 180 may control power, which is input/output to/from the battery 190, on the basis of the temperature of the electronic apparatus 100. The temperature of the electronic apparatus 100 may be the temperature of the battery 190, the surface temperature of the electronic apparatus 100, and the temperature of the system 101 (i.e., at least one of the elements (e.g., the display unit 110, the input unit 120, the control unit 140, the communication unit 150, the storage unit 160, the audio unit 170, etc.) of the electronic apparatus 100) of the electronic apparatus 100. The power management unit 180 may receive the measured temperature of the electronic apparatus 100 from the sensor unit 130. Alternatively, the power management unit 180 may include a separate temperature sensor for measuring the temperature of the electronic apparatus 100.

The power management unit 180 may determine whether the measured temperature of the electronic apparatus 100 exceeds a preset first reference temperature. When the measured temperature of the electronic apparatus 100 exceeds the first reference temperature, the power management unit 180 may temporarily stop charging the battery 190 during a preset time period. After the passage of the preset time period, the electronic apparatus 100 may restart the charging of the battery 190.

When the temperature of the electronic apparatus 100 is increased, the electronic apparatus 100 may malfunction (or sustain a damage) and/or the battery 190 may swell. While the electronic apparatus 100 is charged, the heat generation amount of the electronic apparatus 100 may be increased. Therefore, according to an embodiment of the present disclosure, when the temperature of the electronic apparatus 100 is higher than or equal to the preset first reference temperature, the power management unit 180 may perform a control operation for temporarily stopping charging the electronic apparatus 100 and reducing the temperature of the electronic apparatus 100.

When the temperature of the electronic apparatus 100 after stopping charging the battery 190 is higher than or equal to a preset second reference temperature, the power management unit 180 may reset a full charging voltage of the battery 190 to have a lower value than the preset value. The second reference temperature may be set to have a lower value than the first reference temperature.

For example, when the first reference temperature is set to 50 degrees and the second reference temperature is set to 45 degrees lower than the first reference temperature, the power management unit 180 may temporarily stop charging the battery 190 at the temperature higher than or equal to 50 degrees, to which the first reference temperature is set, and may determined whether the temperature after the passage of a predetermined time period is reduced and is lower than 45 degrees, to which the preset second reference temperature is set. When the measured temperature is lower than 45 degrees which is the second reference temperature, the power management unit 180 may restart the charging of the battery 190 without any change. In contrast, when the measured temperature is higher than or equal to 45 degrees, the power management unit 180 may reset the full charging voltage, and may then start the charging of the battery 190.

When the full charging voltage of the battery 190 is high, a charging time period of the battery 190 may be increased, or the amount of power supplied to the battery 190 may be increased. Accordingly, the heat generation amount according to the charging of the battery 190 may be increased, and the swelling of the battery 190 according to a temperature increase may become more likely to occur. According to an embodiment of the present disclosure, when the temperature of the electronic apparatus 100 does not become lower than or equal to the preset second reference temperature even after stopping charging the battery 190, the power management unit 180 may prevent the swelling of the battery 190 by resetting the full charging voltage to have a low value. According to an embodiment of the present disclosure, when the measured temperature is higher than or equal to a preset function limitation temperature, the power management unit 180 may perform a control operation for deactivating a particular user function. The function limitation temperature may be set to have a higher value than the first reference temperature and the second reference temperature. For example, when the first reference temperature is equal to 60 degrees, the function limitation temperature may be set to 70 degrees higher than the first reference temperature.

For example, in a case where the electronic apparatus 100 is a portable terminal, when the measured temperature is higher than or equal to the function limitation temperature (e.g., 70 degrees), the power management unit 180 may forcibly terminate and may deactivate all other applications except for a telephone call function, a message function, a telephone book function, and/or the like of the portable terminal. According to an embodiment of the present disclosure, the power management unit 180 may terminate and deactivate a subsidiary user function (e.g., an application, etc.) except for an important user function, and thereby can reduce the heat generation amount of the electronic apparatus 100 and can prevent the temperature of the electronic apparatus 100 from being further increased.

According to an embodiment of the present disclosure, when the measured temperature is higher than or equal to a preset system limitation temperature, the power management unit 180 may deactivate the particular system 101 of the electronic apparatus 100. The system limitation temperature may be set to have a higher value than the function limitation temperature. For example, when the function limitation temperature is equal to 70 degrees, the system limitation temperature may be set to 75 degrees.

When the measured temperature is higher than or equal to the preset system limitation temperature, the power management unit 180 may turn off the power supply of the particular hardware or the particular system 101 of the electronic apparatus 100, or may deactivate the particular hardware or the particular system 101 of the electronic apparatus 100. The power management unit 180 may deactivate a power control module for charging the battery 190 or the power management unit 180 itself.

When the measured temperature is higher than or equal to a preset power-off temperature, the power management unit 180 may turn off the electronic apparatus 100. The power-off temperature may be set to have a higher value than the system limitation temperature. For example, when the system limitation temperature is equal to 75 degrees, the power-off temperature may be set to 80 degrees. When the temperature of the electronic apparatus 100 is excessively increased, there may occur problems, such as the swelling of the battery 190, the damage of an internal element of the electronic apparatus 100, the explosion or damage of the electronic apparatus 100, and the like. According to an embodiment of the present disclosure, when the measured temperature is higher than or equal to the power-off temperature, the power management unit 180 may power of the electronic apparatus 100 (e.g., independently or in conjunction with the control unit 140). According to an embodiment of the present disclosure, before turning off power of the electronic apparatus 100, the power management unit 180 may output an alarm sound through the audio unit 170, or may display a warning message on the display unit 110.

Specifically, according to various embodiments of the present disclosure, the power management unit 180 may perform a preset operation according to the measured temperature. For example, in a case where the first reference temperature is set to 60 degrees, the function limitation temperature is set to 70 degrees, the system limitation temperature is set to 75 degrees, and the power-off temperature is set to 80 degrees, when the measured temperature is higher than or equal to 60 degrees, the power management unit 180 may stop charging the battery 190 in order to prevent the swelling of the battery 190. When the measured temperature is higher than or equal to 70 degrees, the power management unit 180 may limit a particular user function (e.g., an application, etc. except for a telephone call function, a message function, and a telephone book function) of the electronic apparatus 100. When the measured temperature is higher than or equal to 75 degrees, the power management unit 180 may power off the particular system component (e.g., the power management unit 180) or particular hardware (e.g., a charging Integrated Circuit (IC), etc.) of the electronic apparatus 100, and may deactivate the particular system or hardware of the electronic apparatus 100. When the measured temperature is higher than or equal to 80 degrees, the power management unit 180 may power off the electronic apparatus 100.

According to an embodiment of the present disclosure, when the full charging voltage is reset, the power management unit 180 may compare the reset full charging voltage with a voltage of the battery 190. When the voltage of the battery 190 is higher than or equal to the reset full charging voltage, the power management unit 180 may cause the battery 190 to discharge.

According to an embodiment of the present disclosure, the power management unit 180 may cause the battery 190 to discharge by activating the particular system 101 within the electronic apparatus 100 and allowing the particular system 101 to consume power. For example, when the electronic apparatus 100 is powered on, the power management unit 180 may cause the battery 190 to discharge by activating the particular system 101 or a particular function within the electronic apparatus 100 and allowing the particular system 101 or the particular function to consume power. When activating the particular system 101 or the particular function, the power management unit 180 may control such that the user outside of the electronic apparatus 100 does not feel that the battery 190 is discharging. For example, the power management unit 180 may only internally activate the particular system 101 in such a manner that the particular system 101 being operating is not displayed on an outer screen of the electronic apparatus 100. For example, the power management unit 180 may consume power by executing a particular function (e.g., a particular application) using the particular system 101 only on a background.

According to an embodiment of the present disclosure, the power management unit 180 may include a discharging circuit. In this case, the power management unit 180 may cause the battery 190 to discharge by driving the discharging circuit. For example, when the electronic apparatus 100 is powered off, the power management unit 180 may cause the battery 190 to discharge by driving the discharging circuit configured in hardware.

The battery 190 may store or generate electricity, and may supply power to the electronic apparatus 100 by using the stored or generated electricity. Examples of the battery 190 may include a rechargeable battery and a solar battery.

Figure 2:
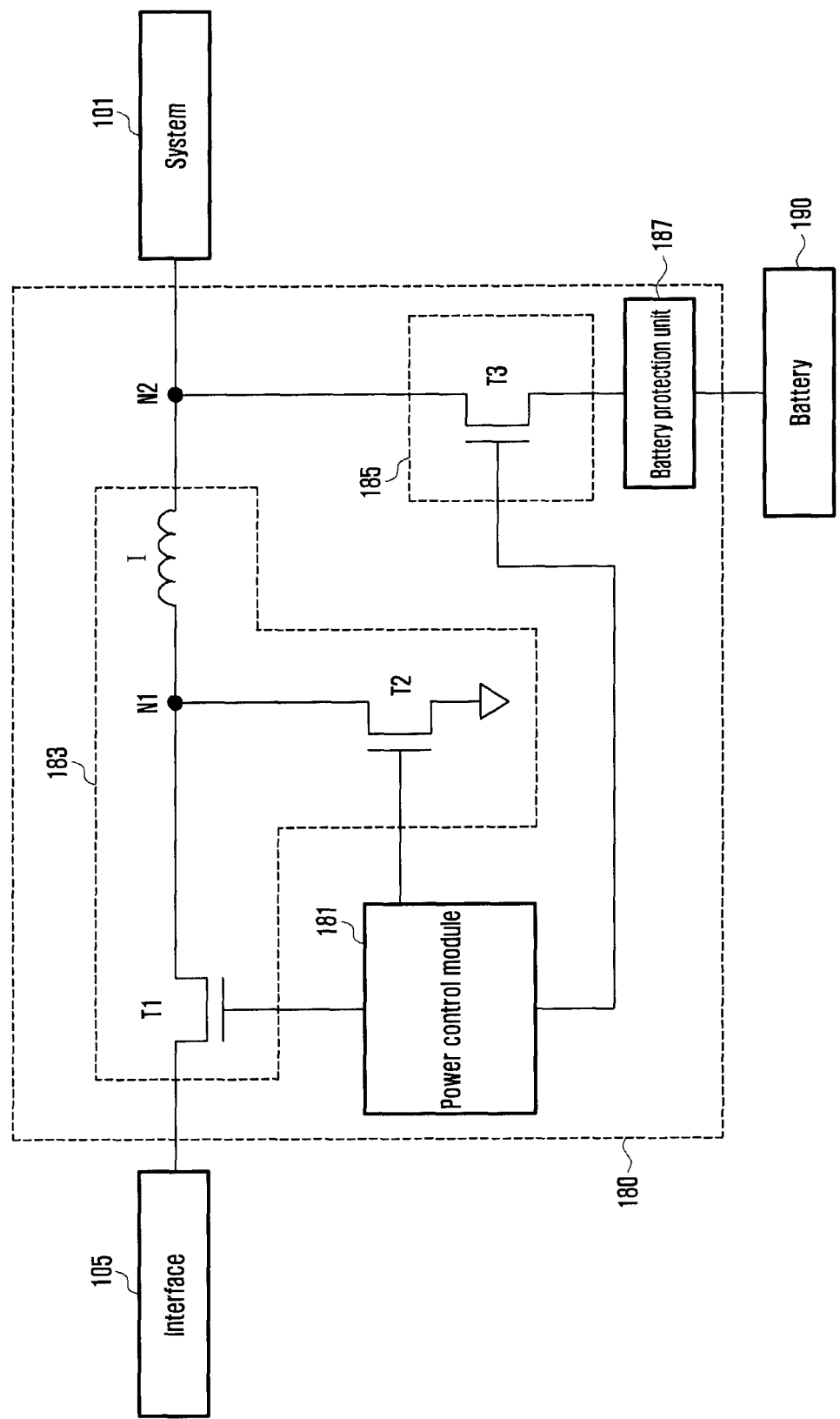
FIG. 2 is a block diagram illustrating an example of a power management unit, according to aspects of the disclosure.

FIG. 2 is a block diagram illustrating an example of a power management unit, according to aspects of the disclosure. More specifically, shown in FIG. 2 are the interface 105, the power management unit 180, the battery 190, and the system 101. The system 101 may include all elements of the electronic apparatus 100 except for the interface 105, the power management unit 180, and the battery 190. For example, the system 101 may include at least one of the display unit 110, the input unit 120, the sensor unit 130, the control unit 140, the communication unit 150, the storage unit 160, and the audio unit 170. The battery 190 may be used to power any of the system's 101 components.

A power supply device, for example, a TA or a TC, that converts AC power into DC power, may be connected to the interface 105. An external wired or wireless charger may be connected to the interface 105.

According to an embodiment of the present disclosure, the power management unit 180 may include a power control module 181, a first switch unit 183, a second switch unit 185, and a battery protection unit 187.

The power control module 181 may include any suitable type of circuitry, such as one or more of a processor, a Field Programmable Gate Array, an Application Specific Integrated Circuit). For example, the power control module 181 may include circuitry configured to control (e.g., open or close) the first switch unit 183 and/or the second switch unit 185. According to an embodiment of the present disclosure, the power control module 181 may include a thermal sensor. According to an embodiment of the present disclosure, the power control module 181 may detect a current level of the interface 105 or that of the battery 190 through the first switch unit 183 or the second switch unit 185.

The first switch unit 183 may include a first transistor T1, of which one end is connected to the interface 105, another end is connected to a first node N1, and receives, as input, a signal which is output from the power control module 181; a second transistor T2, of which one end is connected to the first node N1, another end is connected to a ground connection, and receives, as input, a signal which is output from the power control module 181; and an inductor I that is connected between the first node N1 and the second node N2.

Under the control of the power control module 181, the first switch unit 183 may adjust or control power delivered to the system 101 from the interface 105 and/or the battery 190. The first switch unit 183 may detect the level of current delivered from the interface 105 to the system 101 or the battery 190.

The second switch unit 185 may include a third transistor T3, of which one end is connected to the battery 190, another end is connected to the second node N2, and receives, as input, a signal which is output from the power control module 181. The system 101 may be connected to the second node N2, and may be supplied with power, output from the power input unit 120, and/or power output from the battery 190, via the second node N2.

Under the control of the power control module 181, the second switch unit 185 may adjust or control power delivered from the interface 105 to the battery 190, or power delivered from the battery 190 to the system 101. In addition, the second switch unit 185 may detect the level of current that is fed into the battery 190 and/or current that is output from the battery 190.

According to an embodiment of the present disclosure, under the control of the power control module 181, the second switch unit 185 may cause the battery 190 to discharge by using the third transistor T3. For example, after a circuit is configured such that one end of the third transistor T3 is connected to the ground, under the control of the power control module 181, the second switch unit 185 may cause the battery 190 to discharge by connecting the battery 190 to the ground.

According to an embodiment of the present disclosure, the electronic apparatus 100 may control power supplied to the system 101 or the battery 190 in such a manner that the power control module 181 controls the first switch unit 183 and/or the second switch unit 185.

For example, when the first, second, and third transistors T1, T2 and T3 are N-channel Metal-Oxide-Semiconductor (NMOS) transistors, if the power control module 181 outputs a high signal to each of the first switch unit 183 and the second switch unit 185, the first, second, and third transistors T1, T2 and T3, power may be supplied from the interface 105 to the system 101 or the battery 190. For example, when the first, second, and third transistors T1, T2 and T3 are NMOS transistors, if the power control module 181 outputs a low signal to the first switch unit 183 and outputs a high signal to the second switch unit 185, the first, second, and third transistors T1, T2 and T3 may cut off the flow of power from the interface 105 to the system 101 or the battery 190. Embodiments of the present disclosure are not limited to instances in which the first, second, and third transistors T1, T2 and T3 are NMOS transistors. Accordingly, the first, second, and third transistors T1, T2 and T3 may be P-channel Metal-Oxide-Semiconductor (PMOS) transistors, and/or any other suitable type of transistors.

According to an embodiment of the present disclosure, each of the first, second, and third transistors T1, T2 and T3 may be controlled via signals output from the power control module 181. Specifically, the level of current flowing between the collector and emitter terminals of each transistor may be varied according to the strength of a signal which is output from the power control module 181. For example, the first switch unit 183 may increase or reduce power, which is supplied from the interface 105 to the system 101 or the battery 190, according to the strength of a signal which is output from the power control module 181. The second switch unit 185 may increase or reduce power, which is supplied from the interface 105 to the battery 190, or power, which is supplied from the battery 190 to the system 101, according to the strength of a signal which is output from the power control module 181.

According to an embodiment of the present disclosure, the power management unit 180 may further include the battery protection unit 187. The battery protection unit 187 may include a discharging circuit for protecting the battery 190.

According to an embodiment of the present disclosure, the battery protection unit 187 may include a Protection Circuit Module (PCM) which is a battery protection circuit that prevents over-discharging, over-charging, and over-current in order to protect the battery 190. The PCM may detect the full charging of the battery 190 on the basis of a voltage level output from the battery 190, and can prevent over-charging and over-current of the battery 190. For example, the PCM may detect the completion of the charging of the battery 190 by detecting that a voltage of the battery 190 is increased and is then again reduced when the battery 190 is fully charged.

According to an embodiment of the present disclosure, under the control of the power control module 181, the PCM may cause the battery 190 to discharge when a particular condition is fulfilled. For example, when the level of voltage output from the battery 190 meets a threshold (e.g., when the voltage level is higher than or equal to a full charging voltage), the PCM may cause the battery 190 to discharge under the control of the power control module 181.

According to an embodiment of the present disclosure, the battery protection unit 187 may include a separate discharging circuit. The discharging circuit may include a resistor, a thermistor, a temperature sensing element, a comparator, and a switch. The discharging circuit may control the switch by comparing a reference voltage with the voltage of the battery 190 through the comparator by hardware. For example, the discharging circuit may be designed such that the battery 190 discharges when the voltage of the battery 190 is higher than or equal to a preset reference voltage.

Figure 3:
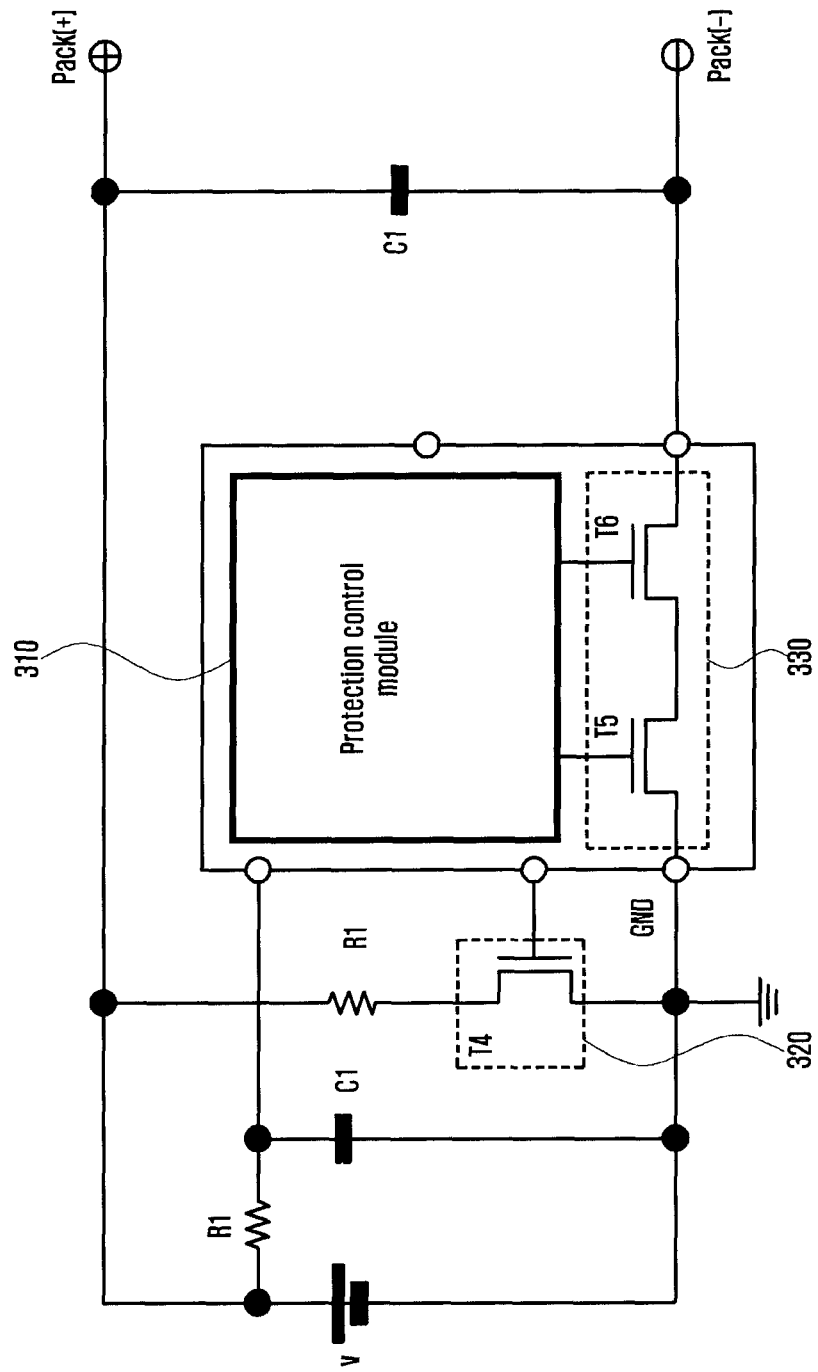
FIG. 3 is a diagram of an example of a discharging circuit, according to aspects of the disclosure.

FIG. 3 is a diagram of an example of a discharging circuit, according to aspects of the disclosure.

The power management unit 180 of the electronic apparatus 100, according to an embodiment of the present disclosure, may include the battery protection unit 187. The battery protection unit 187 may include the PCM 181.

The battery 190 or a battery pack may be connected to one side end of a circuit of the PCM 181. The PCM 181 may include multiple resistors (R1) and multiple capacitors (C1). According to an embodiment of the present disclosure, the PCM 181 may include a protection control module 310, a third switch unit 320, and a fourth switch unit 330.

The protection control module 310 can prevent over-charging, over-current, and over-discharging of the battery 190 by controlling (e.g., opening and/or closing) the third switch unit 320 and the fourth switch unit 330. According to an embodiment of the present disclosure, the protection control module 310 may cause the battery 190 to discharge by controlling the third switch unit 320. The protection control module 310 may include a thermal sensor. Additionally or alternatively, the protection control module 310 may include a voltage or current sensor that detects a voltage of the battery 190.

The protection control module 310 may control power, which is supplied to the battery 190, and power, which is supplied from the battery 190 to system 101 or the electronic apparatus 100, through the fourth switch unit 330. When the protection control module 310 detects that the battery 190 is fully charged, the protection control module 310 may cut off the power supplied to the battery 190 to prevent over-charging by controlling the fourth switch unit 330.

According to an embodiment of the present disclosure, when the voltage of the battery 190 is higher than or equal to a preset full charging voltage, or when the temperature of the electronic apparatus 100 becomes higher than or equal to a predetermined value and reaches a high temperature, the protection control module 310 may cause the battery 190 to discharge by controlling the third switch unit 320 and connecting the battery 190 to the ground.

Figure 4:
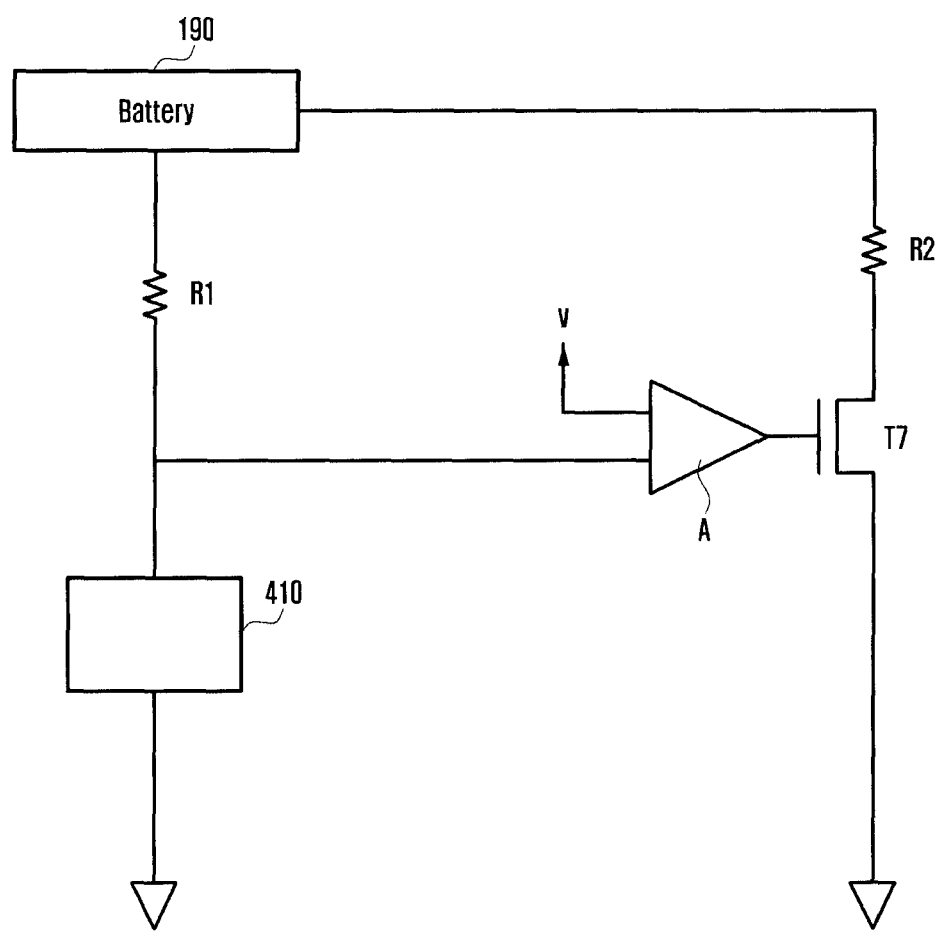
FIG. 4 illustrates another example of a discharging circuit, according to an embodiment of the present disclosure.

FIG. 4 illustrates another example of a discharging circuit, according to an embodiment of the present disclosure.

The power management unit 180 of the electronic apparatus 100, according to an embodiment of the present disclosure, may include the battery protection unit 187. The battery protection unit 187 may include a discharging circuit illustrated in FIG. 4. For example, the battery protection unit 187 may include a discharging circuit that causes the battery 190 to discharge when the voltage output from the battery 190 reaches a threshold.

The battery 190 may be connected to two resistance elements R1 and R2 (e.g., resistors). One end of the resistance element R1 may be connected to the battery 190, and the other end thereof may be connected to a comparator A opposite the resistance element R1, or may be connected to a sensing element 410 for temperature sensing. The resistance element R2 may be connected between a transistor T7 and the battery 190.

The sensing element 410 may detect a temperature change of the electronic apparatus 100. According to an embodiment of the present disclosure, the sensing element 410 may include a thermistor that is built-into or otherwise arranged to measure the temperature of the battery 190. The thermistor may be a resistor using a semiconductor having an electrical resistance value changing according to the temperature. For example, the thermistor of may detect the temperature change of the electronic apparatus 100 according to a change in the electrical resistance value. Additionally or alternatively, according to an embodiment of the present disclosure, the sensing element 410 may include an IC for temperature sensing. The sensing element 410 may more accurately detect the temperature of the electronic apparatus 100 by using the IC for temperature sensing.

The comparator A may be connected to a power source supplying a reference voltage V. The comparator A may compare a voltage of the battery 190 with the reference voltage V by comparing the reference voltage V with a voltage at a node connected to the battery 190, and may output a signal, which corresponds to a result of the comparison, to the transistor T7.

The transistor T7 may serve as a switch in response to a signal which is output from the comparator A. Specifically, when the voltage of the battery 190 is higher than or equal to the reference voltage V, the transistor T7 may connect the battery 190 to a ground connection through a circuit, to which the resistance element R2 is connected, and may cause the battery 190 to be discharged. In contrast, when the voltage of the battery 190 is lower than the reference voltage V, the transistor T7 may disconnect the connection of the battery 190 with the ground connection, and may stop the discharging of the battery 190.

Figure 5:
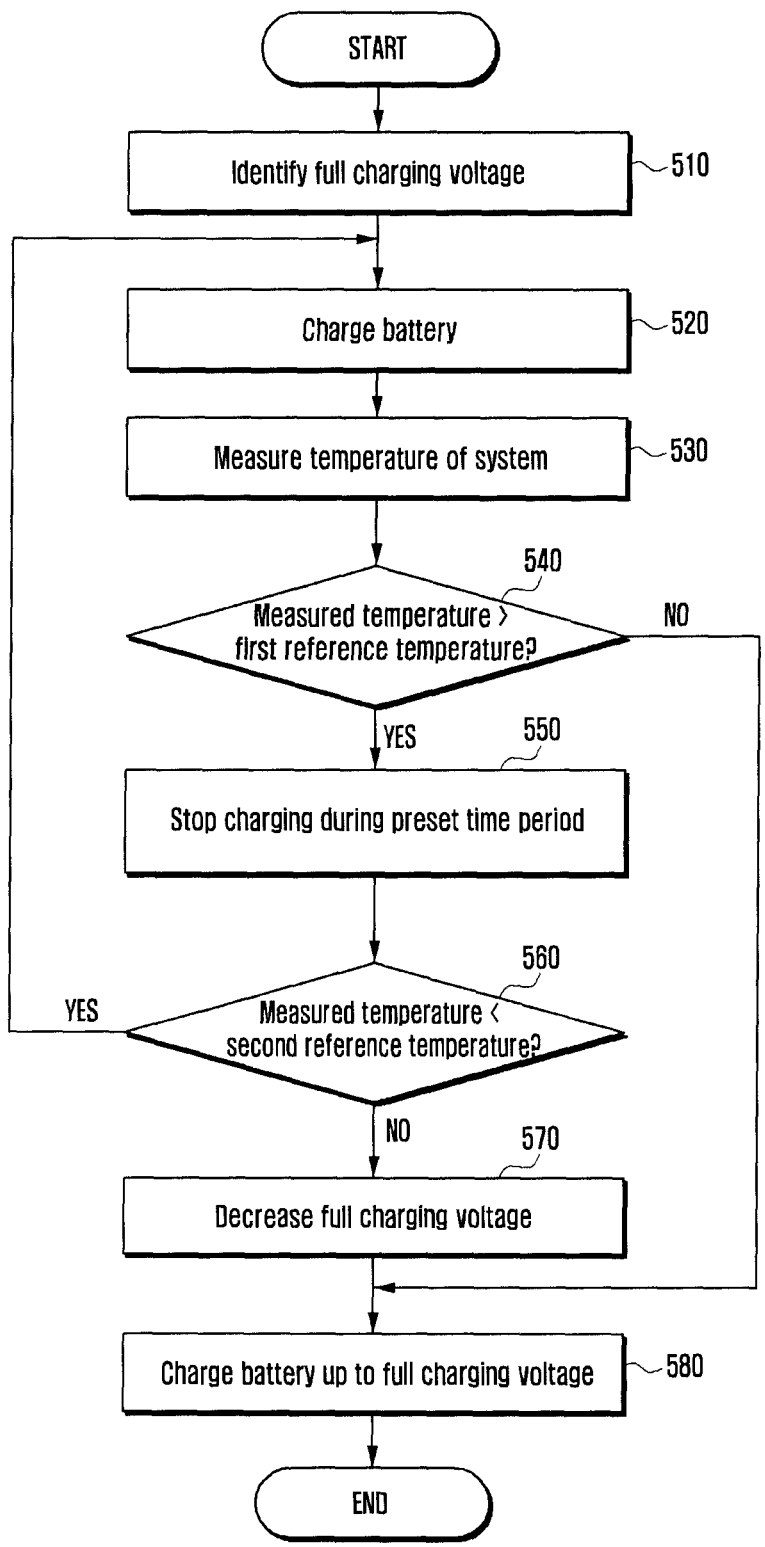
FIG. 5 is a flowchart of an example of a process, according to an embodiment of the present disclosure.

FIG. 5 is a flowchart of an example of a process, according to an embodiment of the present disclosure. In operation 510, the electronic apparatus 100 may identify a full charging voltage. The full charging voltage represents a voltage that is output from the battery 190 when the battery 190 is fully charged. When the electronic apparatus 100 is initially booted up, or when the electronic apparatus 100 begins to be charged, the electronic apparatus 100 may have a preset basic full charging voltage. For example, when the electronic apparatus 100 begins to be charged, the electronic apparatus 100 may have a full charging voltage value which is preset according to the capacity of the battery 190. For example, the electronic apparatus 100 may have a full charging voltage which is initially set to have a value of 4.4 V.

In operation 520, the electronic apparatus 100 may start charging the battery 190. The electronic apparatus 100 may be supplied with power from an external power supply device connected thereto. The electronic apparatus 100 may charge the battery 190 with the power supplied from the external power supply device.

In operation 530, the electronic apparatus 100 may measure the temperature of the electronic apparatus 100. For example, while the battery 190 is being charged, the electronic apparatus 100 may measure a temperature of the system 101 (e.g., the temperature of at least one of the elements of the electronic apparatus 100), a surface temperature of the electronic apparatus 100, or a temperature of the battery 190.

In operation 540, the electronic apparatus 100 may compare the measured temperature with a first reference temperature. The first reference temperature is a reference temperature at which the system 101 and/or the battery may be damaged (or otherwise malfunction), and may have a preset value.

When the measured temperature exceeds the first reference temperature, the electronic apparatus 100 may perform operation 550. In contrast, when the measured temperature is lower than or equal to the first reference temperature, the electronic apparatus 100 may perform operation 580.

In operation 550, the electronic apparatus 100 may stop charging the battery 190 during a preset time period. The electronic apparatus 100 may stop charging the battery 190 during the preset time period, so as to prevent the temperature of the electronic apparatus 100 from increasing 100 and/or cause the temperature to decrease.

In operation 560, the electronic apparatus 100 may compare the temperature of the electronic apparatus 100, which is measured after the passage of the preset time period, with a preset second reference temperature. The second reference temperature may be preset to have a lower value than the first reference temperature. The electronic apparatus 100 may compare the measured temperature with the second reference temperature, and may determine whether the temperature of the electronic apparatus 100 has returned to a normal range (e.g., a temperature range that is considered normal for the electronic apparatus 100).

When the measured temperature is lower than the second reference temperature, the electronic apparatus 100 may perform operation 520. Otherwise, the apparatus may proceed to operation 570.

When the measured temperature is higher than or equal to the second reference temperature, the electronic apparatus 100 may perform operation 570.

In operation 570, the electronic apparatus 100 may lower the full charging voltage of the battery. Specifically, the electronic apparatus 100 may cause the full charging voltage to have a lower value than the preset value, and thereby may reduce the time for which the battery will be charged and/or the amount of heat generated over the course of charging the battery. The electronic apparatus 100 can prevent the occurrence of swelling of the battery 190 by reducing the amount of power delivered to the battery 190 and reducing the temperature of the electronic apparatus 100.

In operation 580, the electronic apparatus 100 may charge the battery 190 up to the full charging voltage. When the electronic apparatus 100 has not lowered the full charging voltage, the electronic apparatus 100 may charge the battery 190 up to the preset full charging voltage. In contrast, when the electronic apparatus 100 has lowered the full charging voltage, the electronic apparatus 100 may charge the battery 190 up to the reset full charging voltage. When the charging of the battery 190 is completed and is terminated, the electronic apparatus 100 may restore the full charging voltage to its initial value.

According to an embodiment of the present disclosure, the electronic apparatus 100 may reset the full charging voltage according to the measured temperature of the electronic apparatus 100. For example, in a case where the first reference temperature is set to 50 degrees and the second reference temperature is set to 45 degrees, when the measured temperature exceeds 50 degrees, the electronic apparatus 100 may temporarily stop charging the battery 190. The electronic apparatus 100 may reset the full charging voltage when the temperature, which is measured after the passage of a preset time period from a time point at which the electronic apparatus 100 stops charging the battery 190, is higher than or equal to 45 degrees. For example, the electronic apparatus 100 may reset the full charging voltage from 4.4 V to 4.25 V. When the temperature of the electronic apparatus 100 does not return to the normal range, the electronic apparatus 100 may reset the full charging voltage to have a lower value, and thereby can reduce a charging time period and can suppress heat generation and a temperature increase according to charging power. Accordingly, the electronic apparatus 100 can prevent problems, such as the damage and malfunction of the electronic apparatus 100 or the system, the swelling of the battery 190, and the like which are caused by a high temperature.

Figure 6:
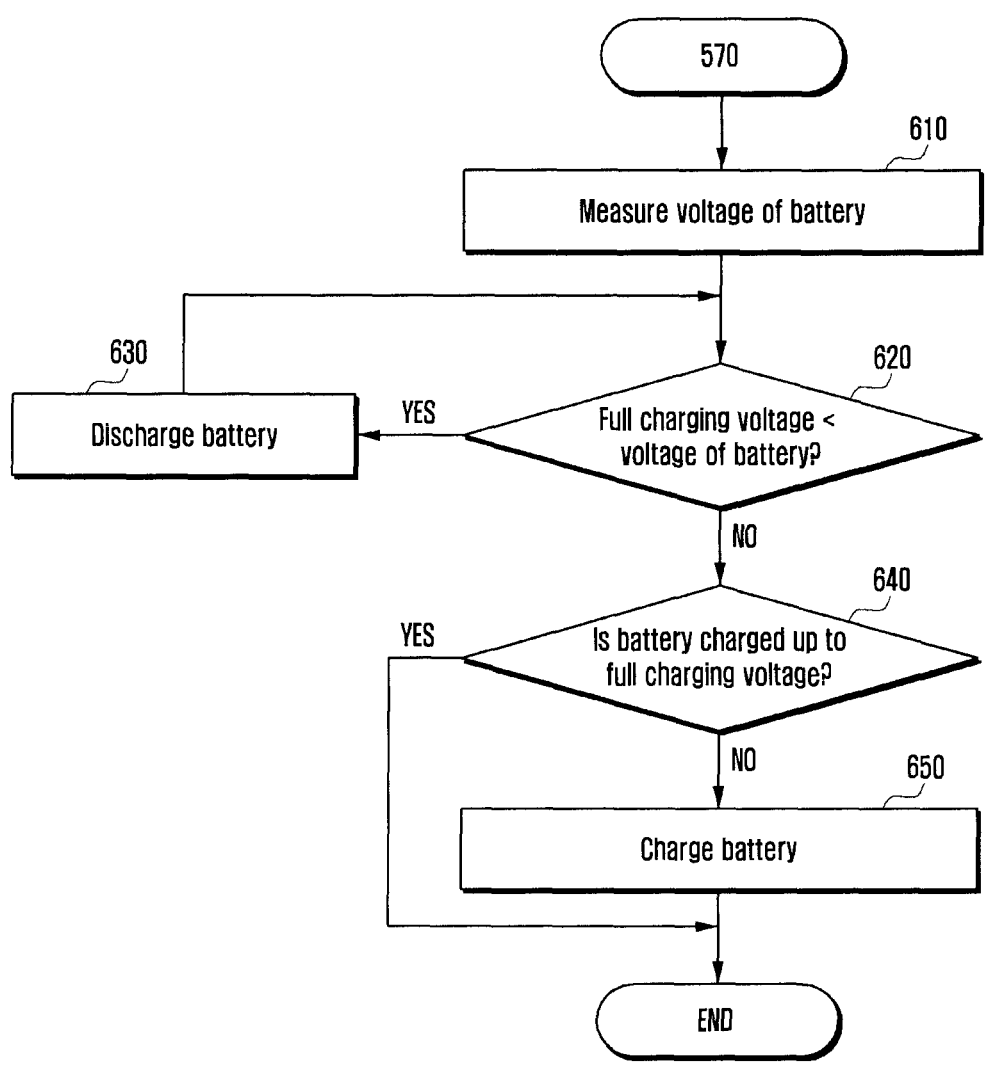
FIG. 6 flowchart of an example of a process, according to an embodiment of the present disclosure.

FIG. 6 flowchart of an example of a process, according to an embodiment of the present disclosure. In operation 610, the electronic apparatus 100 may measure a voltage output from the battery 190 to determine the degree to which the battery is charged. According to aspects of the disclosure, the voltage output from the battery may be continuously monitored.

In operation 620, the electronic apparatus 100 may compare the battery's full charging voltage with the measured voltage of the battery 190. When the voltage of the battery 190 is higher than the full charging voltage, the electronic apparatus 100 may perform operation 630. In contrast, when the voltage of the battery 190 is lower than the full charging voltage, the electronic apparatus 100 may perform operation 640.

In operation 630, the electronic apparatus 100 may cause the battery 190 to discharge. According to an embodiment of the present disclosure, the electronic apparatus 100 may cause the battery 190 to discharge by software while the electronic apparatus 100 is powered on. For example, the electronic apparatus 100 may consume power by activating a predetermined component of the system 101 or a particular user function within the electronic apparatus 100. The electronic apparatus 100 may activate the particular component of system 101 or perform the particular user function transparently from the user. For example, the electronic apparatus 100 may only internally perform the particular user function in the background without changing any of the information displayed on the screen of the electronic apparatus 100 (i.e., without the discharging manifesting itself in any way on the screen). Alternatively, the electronic apparatus 100 may drive internal hardware thereof and may cause the internal hardware thereof to consume power. The electronic apparatus 100 may control such that no change (e.g., a change of the displayed screen, vibration of the electronic apparatus 100, heat generation of the electronic apparatus 100, etc.) takes place while the battery 190 is being discharged. For example, the electronic apparatus 100 may cause the battery 190 to discharge by activating only the particular system which is capable of being performed without being externally displayed among the systems 101.

The electronic apparatus 100 may cause the battery 190 to discharge by hardware in a state where the electronic apparatus 100 is powered off. For example, the electronic apparatus 100 may cause the battery 190 to discharge by using a particular discharging circuit. According to an embodiment of the present disclosure, the electronic apparatus 100 may cause the battery 190 to discharge by controlling a switch of the power management unit 180 to connect the battery 190 to the ground connection. According to an embodiment of the present disclosure, the electronic apparatus 100 may cause the battery 190 to discharge by controlling a switch within the battery protection unit 187 (e.g., a PCM, etc.), which is connected to the battery 190, to connect the battery 190 to the ground connection. According to an embodiment of the present disclosure, the electronic apparatus 100 may include a separate discharging circuit. For example, the electronic apparatus 100 may include a circuit that compares a reference voltage (e.g., a full charging voltage) with a voltage of the battery 190 by using a comparator and the like by hardware, and causes a switch to operate when the voltage of the battery 190 is higher than or equal to the reference voltage. Specifically, the electronic apparatus 100 may include a circuit, an element, and/or a module that automatically connects the battery 190 to the ground connection and causes the battery 190 to discharge when the voltage of the battery 190 is higher than or equal to a particular voltage. In a state where the electronic apparatus 100 is powered off, the electronic apparatus 100 may drive the PCM or the discharging circuit of the battery protection unit 187 under the control of the power management unit 180 without an operation of the control unit 140.

According to an embodiment of the present disclosure, when the battery 190 is charged to the full charging voltage or more, the electronic apparatus 100 may cause the battery 190 to discharge, and thereby can prevent swelling of the battery 190 due to an excessive voltage and the like. According to an embodiment of the present disclosure, the electronic apparatus 100 may cause the battery 190 to discharge through the power management unit 180 or the battery protection unit 187 that is driven independently of the other systems 101 including the control unit 140.

In operation 640, the electronic apparatus 100 may determine whether the battery 190 is fully charged up to the full charging voltage (e.g., determine whether the voltage output from the battery is equal to or otherwise matches the full charging voltage). When the battery 190 is not fully charged, the electronic apparatus 100 may perform operation 650. In contrast, when the battery 190 is fully charged, the electronic apparatus 100 may terminate the charging of the battery 190.

In operation 650, the electronic apparatus 100 may charge the battery 190 up to the full charging voltage. When the full charging voltage is reset, the electronic apparatus 100 may charge the battery 190 up to the reset full charging voltage.

Figure 7:
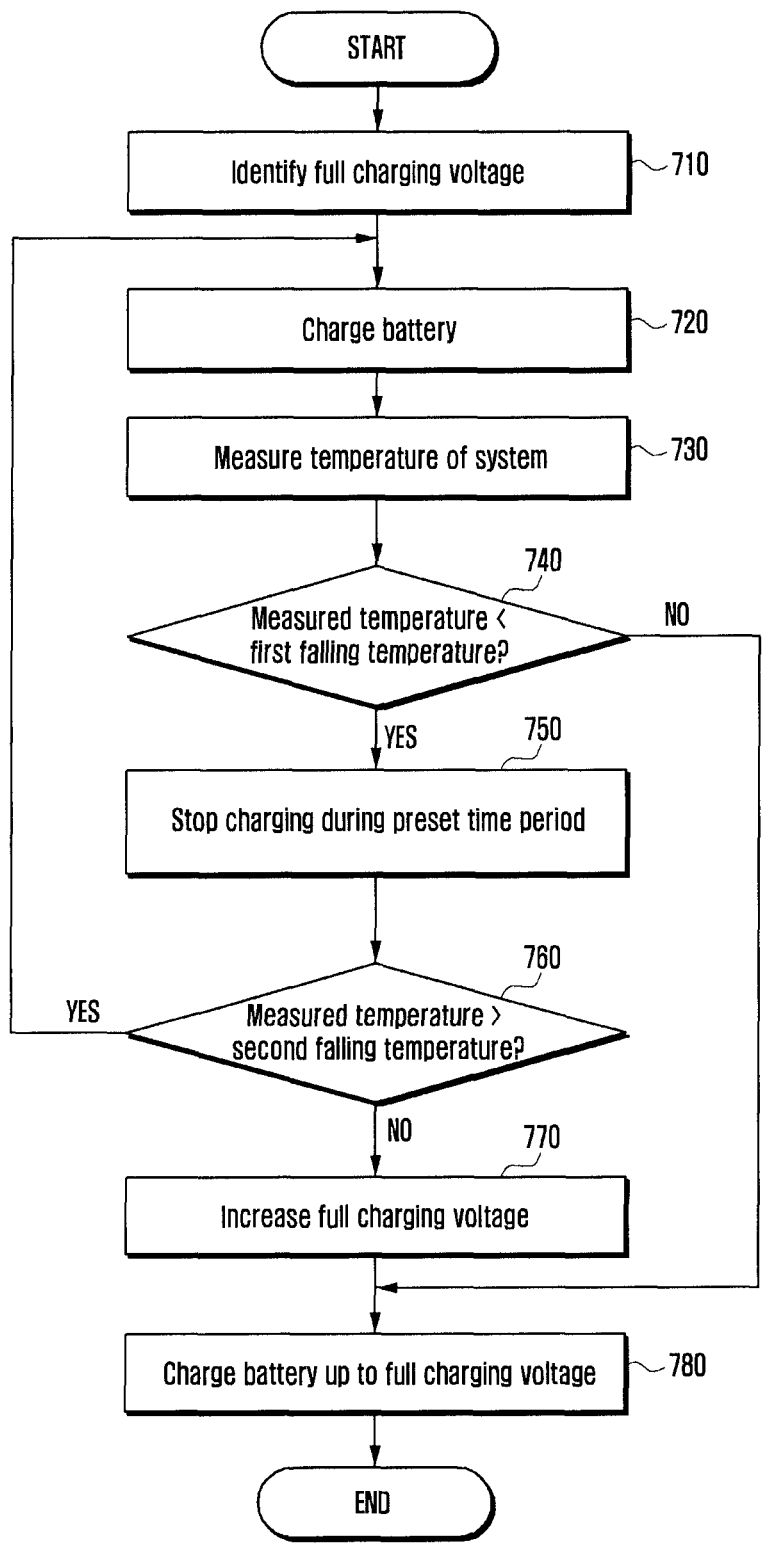
FIG. 7 flowchart of an example of a process, according to an embodiment of the present disclosure.

FIG. 7 flowchart of an example of a process, according to an embodiment of the present disclosure. In operation 710, the electronic apparatus 100 may identify a full charging voltage. When the battery 190 begins to be charged, the electronic apparatus 100 may have a full charging voltage value which is preset according to the capacity of the battery 190.

In operation 720, the electronic apparatus 100 may start charging the battery 190. The electronic apparatus 100 may be supplied with power from an external power supply device connected to the electronic apparatus 100, and may charge the battery 190.

In operation 730, the electronic apparatus 100 may measure its temperature. For example, while the battery 190 is charged, the electronic apparatus 100 may measure a temperature of the system 101 (i.e., the temperature of at least one of the elements of the electronic apparatus 100, a surface temperature of the electronic apparatus 100, or a temperature of the battery 190).

In operation 740, the electronic apparatus 100 may compare the measured temperature with a first falling temperature. The first falling temperature may be a temperature that is lower than the normal operating temperature of the electronic device 100, and/or a temperature at which the electronic apparatus 100 may be damaged or otherwise malfunction.

When the measured temperature is lower than the first falling temperature, the electronic apparatus 100 may perform operation 750. In contrast, when the measured temperature is higher than or equal to the first falling temperature, the electronic apparatus 100 may perform operation 780.

In operation 750, the electronic apparatus 100 may stop charging the battery 190 during a preset time period. The electronic apparatus 100 may continuously measure its temperature after it has stopped charging the battery 190.

In operation 760, the electronic apparatus 100 may compare the temperature of the electronic apparatus 100, which is measured after a preset time period, with a preset second falling temperature. The second falling temperature may have a higher value than the first falling temperature. The electronic apparatus 100 may compare the measured temperature with the second falling temperature, and determine whether the temperature of the electronic apparatus 100 has returned to the normal operating temperature range of the electronic apparatus 100.

When the measured temperature exceeds the second falling temperature, the electronic apparatus 100 may perform operation 720. When the temperature, which is measured after stopping charging the battery 190, exceeds the second falling temperature, the electronic apparatus 100 may detect that the temperature of the electronic apparatus 100 has returned to the normal range, and may again charge the battery 190 with the preset full charging voltage.

When the measured temperature is lower than or equal to the second falling temperature, the electronic apparatus 100 may perform operation 770.

In operation 770, the electronic apparatus 100 may increase the full charging voltage. Specifically, the electronic apparatus 100 may cause the full charging voltage to have a higher value, and thereby may increase the time for which the battery is being charged and/or increase the amount of heat generated over the course of charging the battery. The electronic apparatus 100 may increase the amount of power delivered to the battery 190 and the temperature of the electronic apparatus 100, and thereby can prevent the occurrence of swelling of the battery 190 and the occurrence of damage to the electronic apparatus 100.

In operation 780, the electronic apparatus 100 may charge the battery 190 up to the full charging voltage. When the electronic apparatus 100 has not increased the full charging voltage, the electronic apparatus 100 may charge the battery 190 up to the preset full charging voltage. In contrast, when the electronic apparatus 100 has increased the full charging voltage, the electronic apparatus 100 may charge the battery 190 up to the new full charging voltage. When the charging of the battery 190 is completed and is terminated, the electronic apparatus 100 may restore the full charging voltage to its initial value.

According to an embodiment of the present disclosure, in operation 780, the electronic apparatus 100 may perform a discharging function according to the voltage of the battery 190 illustrated in FIG. 6.

According to an embodiment of the present disclosure, as the temperature of the electronic apparatus 100 is reduced, the electronic apparatus 100 may perform a function of preventing the swelling of the battery 190. For example, in a case where the first falling temperature is set to 5 degrees below zero and the second falling temperature is set to 5 degrees above zero, when the measured temperature of the electronic apparatus 100 is lower than 5 degrees below zero, the electronic apparatus 100 may stop charging the battery 190 during a preset time period. When the temperature of the electronic apparatus 100, which is measured after the passage of the preset time period from a time point of stopping charging the battery 190, is lower than or equal to 5 degrees above zero, the electronic apparatus 100 may determine that the temperature of the electronic apparatus 100 does not return to the normal range. In this case, the electronic apparatus 100 may reset the full charging voltage to have a lower value. For example, the electronic apparatus 100 may reset the full charging voltage from 4.4 V to 4.25 V. When the temperature of the electronic apparatus 100, which is measured after stopping charging the battery 190, exceeds 5 degrees above zero, the electronic apparatus 100 may determine that the temperature of the electronic apparatus 100 returns to the normal range, and may again charge the battery 190 without resetting the full charging voltage.

Figure 8:
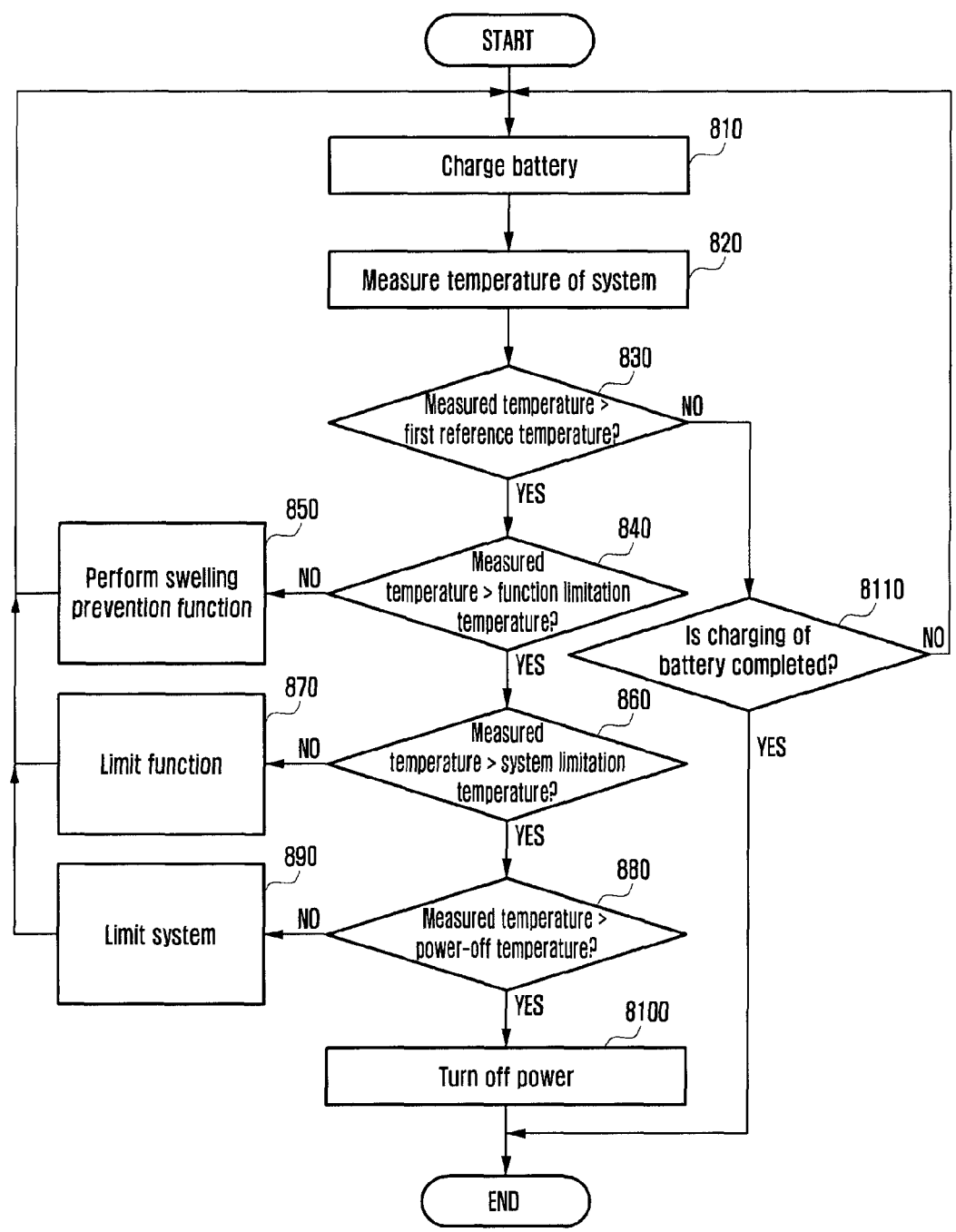
FIG. 8 flowchart of an example of a process, according to an embodiment of the present disclosure.

FIG. 8 is a flowchart of an example of a process, according to an embodiment of the present disclosure. Hereinafter, a first reference temperature, a function limitation temperature, a system limitation temperature, and a power limitation temperature may be different temperature thresholds, each of which is larger than the former.

In operation 810, the electronic apparatus 100 may start the charging of the battery 190. The electronic apparatus 100 may deliver power, which is supplied from an external power supply device, to the battery 190.

In operation 820, the electronic apparatus 100 may measure its temperature. For example, while the battery 190 is charged, the electronic apparatus 100 may measure, the temperature of the system 101, the temperature of at least one of the elements of the electronic apparatus 100, the surface temperature of the electronic apparatus 100, or the temperature of the battery 190.

In operation 830, the electronic apparatus 100 may compare the measured temperature with the first reference temperature. When the measured temperature exceeds the first reference temperature, the electronic apparatus 100 may perform operation 840. In contrast, when the measured temperature is lower than or equal to the first reference temperature, the electronic apparatus 100 may perform operation 8110.

In operation 840, the electronic apparatus 100 may compare the measured temperature with the function limitation temperature. When the measured temperature exceeds the function limitation temperature, the electronic apparatus 100 may perform operation 860. In contrast, when the measured temperature is lower than or equal to the function limitation temperature, the electronic apparatus 100 may perform operation 870.

In operation 850, the electronic apparatus 100 may perform a swelling prevention function. When the temperature of the electronic apparatus 100 exceeds the first reference temperature and exceeds the function limitation temperature, the electronic apparatus 100 may perform the swelling prevention function.

Examples of the swelling prevention function of the electronic apparatus 100 may include the embodiments illustrated in FIGS. 5, 6, and 7. Specifically, the electronic apparatus 100 may temporarily stop charging the battery 190 during a preset time period. When the temperature of the electronic apparatus 100, which is measured after the passage of the preset time period, is lower than the second reference temperature, the electronic apparatus 100 may again charge the battery 190. In contrast, when the measured temperature is higher than or equal to the second reference temperature, the electronic apparatus 100 may lower the battery's full charging voltage, and may then again charge the battery 190. When a voltage of the battery 190 is higher than or equal to the full charging after the full charging voltage has been lowered, the electronic apparatus 100 may cause the battery 190 to discharge.

In operation 860, the electronic apparatus 100 may compare the measured temperature with the system limitation temperature. When the measured temperature exceeds the system limitation temperature, the electronic apparatus 100 may perform operation 870. In contrast, when the measured temperature is lower than or equal to the system limitation temperature, the electronic apparatus 100 may perform operation 880.

In operation 870, the electronic apparatus 100 may limit a particular user function. When the measured temperature exceeds the function limitation temperature and is lower than or equal to the system limitation temperature, the electronic apparatus 100 may restrict the use of a particular function. For example, the electronic apparatus 100 may forcibly terminate and/or deactivate the particular user function. For example, when the electronic apparatus 100 is a portable terminal, the electronic apparatus 100 may deactivate the other user functions except for basically-provided user functions (e.g., a telephone call function, a message function, a telephone book function, etc.). Specifically, the electronic apparatus 100 may perform a control operation for reducing the temperature of the electronic apparatus 100 by limiting the utilization of a user function to a minimum and by reducing the unnecessary use of power and the load of the system 101.

In operation 880, the electronic apparatus 100 may compare the measured temperature with a power-off temperature. When the measured temperature exceeds the power-off temperature, the electronic apparatus 100 may perform operation 8100. In contrast, when the measured temperature is lower than or equal to the power-off temperature, the electronic apparatus 100 may perform operation 890.

In operation 890, the electronic apparatus 100 may limit an operation of the particular system 101. When the measured temperature exceeds the system limitation temperature and is lower than or equal to the power-off temperature, the electronic apparatus 100 may limit an operation of the particular system 101. The electronic apparatus 100 may turn off or otherwise deactivate a particular hardware component of the electronic apparatus 100. For example, the electronic apparatus 100 may deactivate the power management unit 180 (e.g., the power control module 181, a charger, etc.). The electronic apparatus 100 may cut off the supply of power to the particular hardware component.

In operation 8100, the electronic apparatus 100 may turn off power. According to an embodiment of the present disclosure, before turning off power, the electronic apparatus 100 may output an alarm sound, or may display a warning message.

In operation 8110, the electronic apparatus 100 may determine whether the charging of the battery 190 is completed. When the charging of the battery 190 is completed, the electronic apparatus 100 may terminate the charging operation. In contrast, when the charging of the battery 190 is not completed, the electronic apparatus 100 may continue to charge the battery 190.

According to an embodiment of the present disclosure, in a case where the first reference temperature is set to 60 degrees, the function limitation temperature is set to 70 degrees, the system limitation temperature is set to 75 degrees, and the power-off temperature is set to 80 degrees, when the temperature of the electronic apparatus 100 exceeds 60 degrees and is lower than or equal to 70 degrees, the electronic apparatus 100 may perform the swelling prevention function (e.g., the embodiments described with reference to FIGS. 5 and 6, etc.). When the measured temperature exceeds 70 degrees and is lower than or equal to 75 degrees, the electronic apparatus 100 may limit a particular user function (e.g., an application, etc. except for a telephone call function, a message function, and a telephone book function). When the measured temperature exceeds 75 degrees and is lower than 80 degrees, the electronic apparatus 100 may cut off power of the particular system (e.g., the power management unit 180) or particular hardware (e.g., a charging IC, etc.), and may deactivate the particular system or hardware. When the measured temperature is higher than or equal to 80 degrees, the electronic apparatus 100 may power itself off.

According to various embodiments of the present disclosure, the electronic apparatus 100 may determine the degree of danger of malfunction which the electronic apparatus is subjected to based on the temperature of the electronic apparatus 100, may perform a function corresponding to the temperature thereof, and thereby can prevent problems, such as swelling of the battery 190, damage to the electronic apparatus 100, and the like which may occur when the electronic apparatus 100 is charged.

Figure 9A:
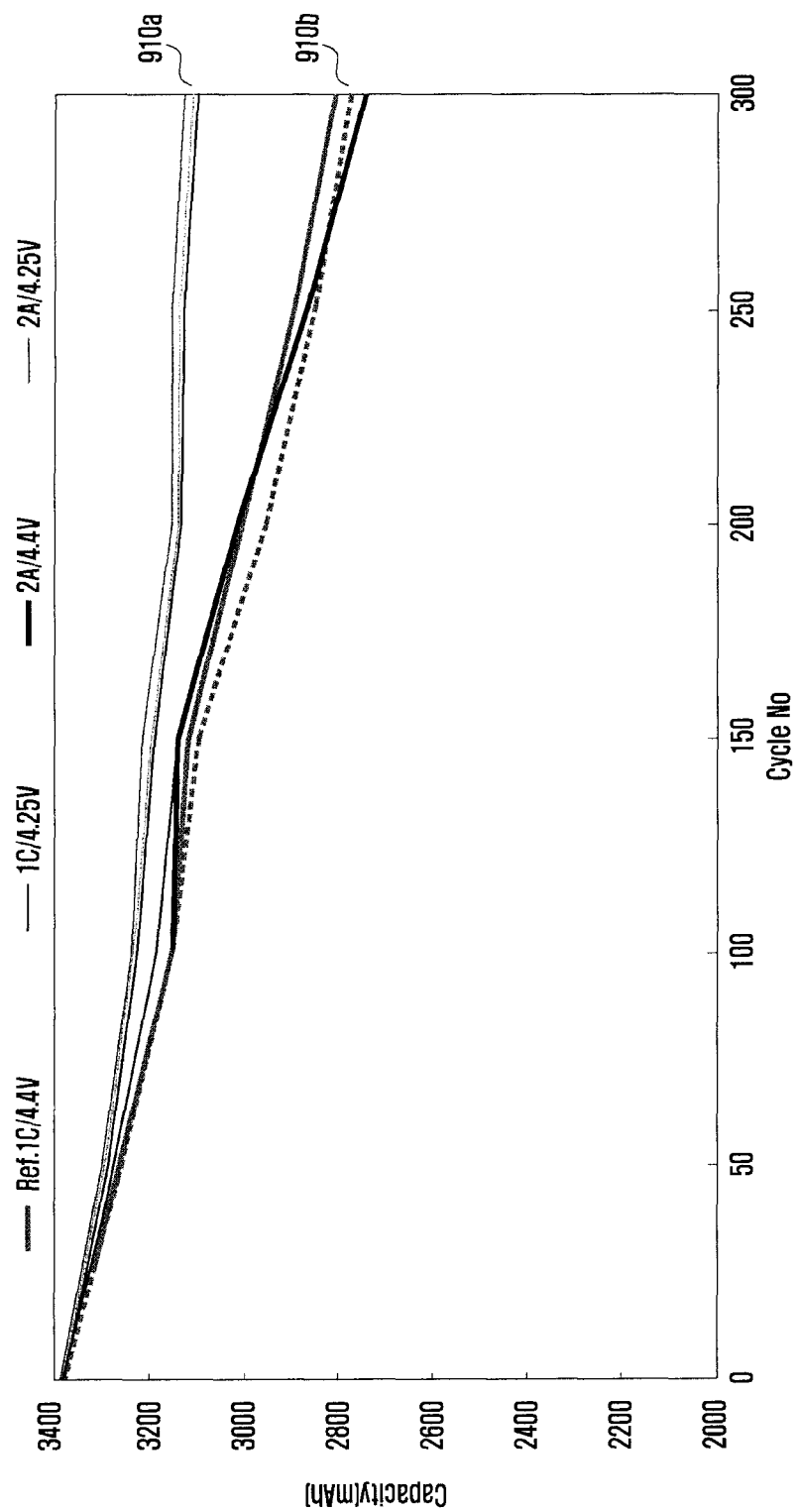
FIG. 9A is a graph illustrating the lifetime curve of a battery, according to an embodiment of the present disclosure.

FIG. 9A is a graph illustrating the lifetime curve of the battery 190 at a particular temperature (e.g., 45 degrees) for different charging voltages. A horizontal axis represents a charging cycle of the battery 190, and a vertical axis represents a charging capacity of the battery 190.

Referring to the graphs indicated by reference numeral 910a, when a full charging voltage is set to 4.4 V, it can be noted that the lifetime of the battery 190 is relatively sharply reduced as the cycle proceeds. Specifically, when the full charging voltage is equal to 4.4 V, the capacity of the battery 190 is sharply reduced as the cycle proceeds. In contrast, referring to the graphs indicated by reference numeral 920a, when the full charging voltage is reduced to 4.25 V, it can be noted that the lifetime of the battery 190 is relatively gently reduced as the cycle proceeds. Specifically, when the full charging voltage is equal to 4.25 V, a capacity reduction of the battery 190 is mitigated as the cycle proceeds.

Figure 9B:
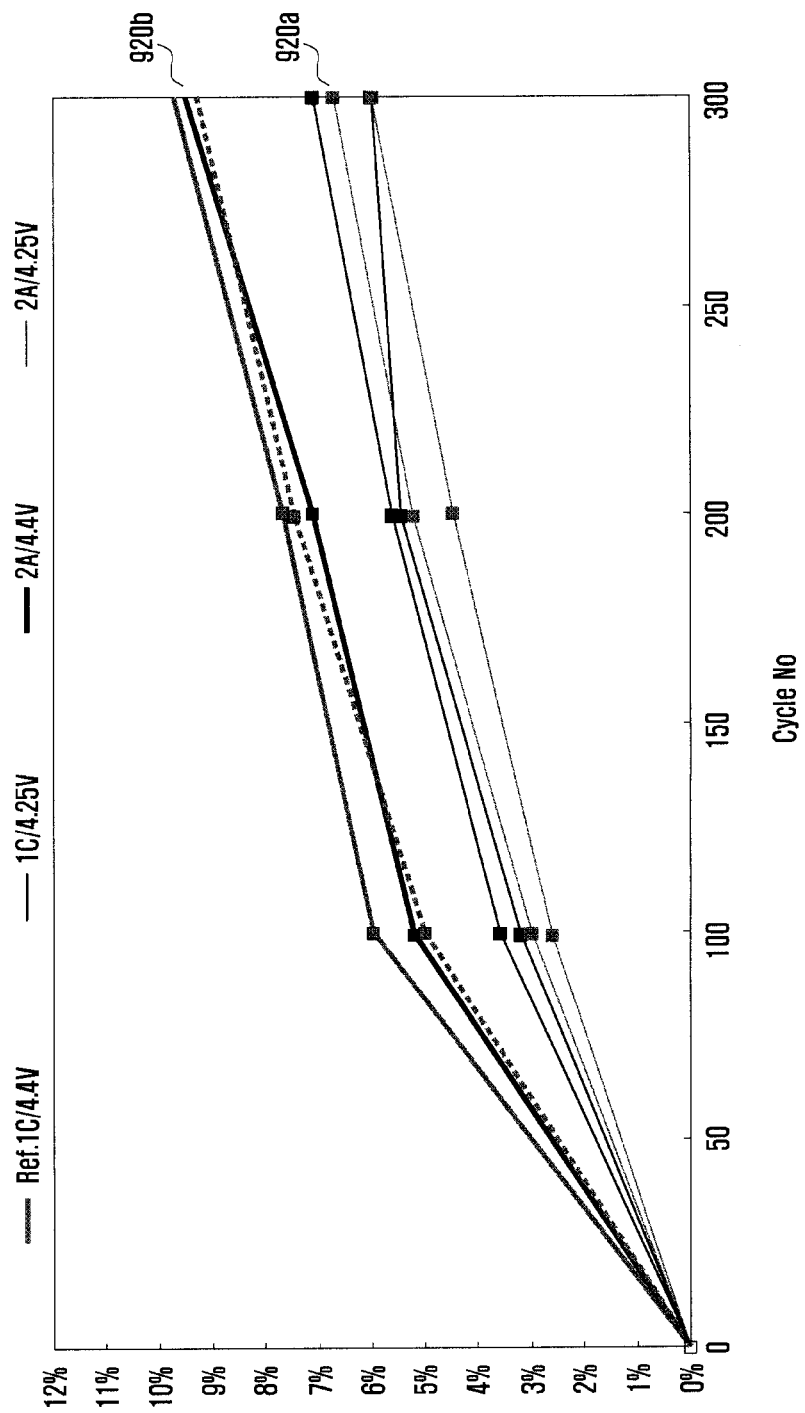
FIG. 9B is a graph illustrating the relationship between temperature and different battery charging voltages, according to an embodiment of the present disclosure.

FIG. 9B is a graph illustrating a temperature change according to a charging cycle of the battery 190 for different charging voltages. A horizontal axis represents the charging cycle of the battery 190, and a vertical axis represents the degree of a temperature change.

Referring to the graphs indicated by reference numeral 910b, when the full charging voltage is set to 4.4 V, it can be noted that a temperature increase (i.e., degree of heat generation of the electronic apparatus 100) is relatively high as the charging cycle of the battery 190 proceeds. Specifically, when the full charging voltage is equal to 4.4 V, the temperature increase, which is caused by the heat generation of the electronic apparatus 100, may abruptly occur as the cycle proceeds. In contrast, referring to the graphs indicated by reference numeral 920b, when the full charging voltage is set to 4.25 V, it can be noted that the degree of the temperature increase is relatively small as the charging cycle of the battery 190 proceeds. Specifically, when the full charging voltage is equal to 4.25 V, the degree of the temperature increase, which is caused by the heat generation of the electronic apparatus 100, may become smaller as the cycle proceeds.

The electronic apparatus 100 and the charging control method of the electronic apparatus 100, according to various embodiments of the present disclosure, may reduce the heat generation of the electronic apparatus 100 by changing the full charging voltage according to the temperature of the electronic apparatus 100, and thereby can not only prevent the swelling of the battery 190, but can also increase the lifetime of the battery 190.

FIGS. 1-9B are provided as an example only. At least some of the steps discussed with respect to these figures can be performed concurrently, performed in a different order, and/or altogether omitted. It will be understood that the provision of the examples described herein, as well as clauses phrased as "such as," "e.g.", "including", "in some aspects," "in some implementations," and the like should not be interpreted as limiting the claimed subject matter to the specific examples.

The above-described aspects of the present disclosure can be implemented in hardware, firmware or via the execution of software or computer code that can be stored in a recording medium such as a CD-ROM, a Digital Versatile Disc (DVD), a magnetic tape, a RAM, a floppy disk, a hard disk, or a magneto-optical disk or computer code downloaded over a network originally stored on a remote recording medium or a non-transitory machine-readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

While the present disclosure has been particularly shown and described with reference to the examples provided therein, it will be understood by those skilled in the art that various changes in form and details may be made therein without departing from the spirit and scope of the present disclosure as defined by the appended claims.

What is claimed is:

1. An electronic device comprising:
   an interface configured to connect to an external power supply device and supply power to a battery;
   a sensor unit configured to measure a temperature of the electronic device; and
   a power management unit configured to charge the battery based on the temperature, wherein the power management unit further configured to:
   temporarily stop charging of the battery for a preset time period in response to the temperature exceeding a first threshold; and
   set a full charging voltage of the battery to a lower value than a currently set value in response to the temperature of the electronic device exceeding a second threshold after the preset time period has passed,
   wherein the power management unit is configured to cause the battery to discharge in response to a voltage currently output from the battery exceeding a threshold.

2. The electronic device of claim 1, wherein the power management unit is configured to deactivate a function of the electronic device in response to the temperature exceeding a threshold.

3. The electronic device of claim 1, wherein the power management unit is configured to deactivate a hardware component of the electronic device in response to the temperature exceeding a threshold.

4. The electronic device of claim 1, wherein the power management unit is configured to power off the electronic device in response to the temperature exceeding a threshold.

5. The electronic device of claim 1, wherein the power management unit causes the battery to discharge by activating a predetermined component of the electronic device.

6. The electronic device of claim 1, wherein the power management unit causes the battery to discharge by activating a discharging circuit that is part of the power management unit.

7. The electronic device of claim 1, wherein the power management unit comprises:
   a first switch unit that controls a supply of power from the interface to the battery;
   a second switch unit that controls the supply of power from the interface to the battery and the supply of power from the battery to one or more hardware components of the electronic device; and
   a power control module that is configured to control the first switch unit and the second switch unit.

8. A method for charging an electronic device, comprising:
   identifying a set value of a full charging voltage of a battery;
   measuring a temperature of the electronic device; and
   charging the battery based on the temperature, wherein charging the battery comprises:
   temporarily stopping the charging of the battery for a preset time period in response to the temperature exceeding a first threshold;
   setting the full charging voltage of the battery to a lower value than the set value in response to the temperature of the electronic device exceeding a second threshold after the preset time period has passed; and
   discharging the battery in response to a voltage currently output from the battery exceeding a threshold.

9. The method of claim 8, further comprising deactivating a function of the electronic device in response to the temperature exceeding a threshold while the battery is being charged.

10. The method of claim 8, further comprising deactivating a hardware component of the electronic device in response to the temperature exceeding a threshold while the battery is being charged.

11. The method of claim 8, further comprising powering off the electronic device in response to the temperature exceeding a threshold while the battery is being charged.

12. The method of claim 8, wherein discharging the battery comprises activating a predetermined component of the electronic device.

13. The method of claim 8, wherein discharging the battery comprises activating a discharging circuit that is part of a power management unit.

14. The charging control method of claim 8, wherein file battery is charged by a power management unit configured to:
   temporarily stop the charging of the battery for a predetermined time period and resuming file charging of the battery when the temperature of the electronic device is lower than a first threshold;
   change the full charging voltage of the battery when the temperature of the electronic device is lower than a second threshold after a preset time period has passed; and
   charge the battery up to the full charging voltage.

* * * * *